Patented Mar. 7, 1950

2,500,107

UNITED STATES PATENT OFFICE 2,500,107

AGENT FOR REMOVAL OF ADHESIVE TAPE AND SIMILAR GUMMY AND TACKY SUBSTANCES

Theodore E. Weichselbaum, Normandy, Mo., assignor to A. S. Aloe Company, St. Louis, Mo., a corporation of Missouri No Drawing. Application March 31, 1947, Serial No. 738,492

2 Claims. (Cl. 252—161)

This invention relates in general to certain new and useful improvements in agents for removal of adhesive tape and similar gummy and tacky substances.

As is well known, it is a common medical and surgical practice to apply dressings to all manner of bodily injuries by the use of adhesive tape and, in fact, adhesive tape is frequently used to make so-called "butterflies" which surgeons use for suturing minor incisions. Adhesive tape is also widely used for splinting various portions of the body in the treatment of sprains, muscular aches, and the like. In all of these applications and uses the doctor and patient are mutually faced with the very unpleasant necessity of ultimately removing the adhesive tape and such removal process is usually quite painful. For this reason, doctors frequently employ hydrocarbon solvents, such as benzene, ether, and the like, to soften the adhesive tape and facilitate removal thereof, but, unfortunately, such solvents are in themselves irritating to the flesh and frequently leave the patient's skin reddened, blistered, or chapped. In addition, the conventional hydrocarbon solvents tend to dissolve the tacky film on the face of the adhesive tape and soften this film to such an extent that the fabric backing of the tape is ordinarily pulled off, leaving a residual gummy film upon the skin which quickly becomes tacky again as soon as the solvent evaporates, leaving an unpleasant coating on the skin which attracts lint and dirt and is extremely uncomfortable. Of course, such residual film can be cleaned off by additional washing of the surface with solvents, but such additional washing is not only time-consuming but frequently adds to the patient's discomfort, particularly in the case of surgical dressings where the flesh around the incision is ordinarily sensitive and any mechanical manipulation thereof produces pain.

It is, therefore, the primary object of the present invention to provide a new and improved agent for loosening and removing adhesive tape and similar gummy substances in a rapid, efficient, and complete manner.

It is also an object of the present invention to provide an agent of the type stated which can be applied to the exposed cloth side of the tape without necessitating direct application to the line of juncture between the adhesive surface and the flesh.

It is a further object of the present invention to provide an agent of the type stated which is substantially non-irritating to the flesh, is non-explosive, externally non-toxic, and does not produce any material smarting or burning when accidentally coming in contact with open wounds, lacerations, and abrasions.

It is a further object of the present invention to provide an agent of the type stated which will remove gummy substances completely and quickly without leaving a residual film on the surface from which such gummy substances have been removed.

With the above and other objects in view, my invention resides in the novel processes and compositions of matter presently described and pointed out in the claims.

Broadly speaking, the present invention resides in the discovery that certain agents, when applied to gummy substances of the type normally used to form the tacky surface on adhesive tape and the like, will cause the tacky or adhesive substances to become non-adherent to the skin or other surface upon which such substances are applied. It has been found in connection with the present invention that poly-glycol ethers, in combination with a very small percentage of a wetting agent of the alkyl sulfate type, will soften and loosen adhesive and gummy substances, such as the tack-producing film on adhesive tape, and permit immediate, complete, and convenient removal thereof.

By way of illustration, and not by way of limitation, the following is an example of an agent formulated in accordance with the present invention:

Di-ethyl ether of ethylene glycol __ 2 parts by vol.
Mono-butyl ether of ethylene glycol _____ 1 part by vol.
Wetting agent_____ 0.20% by vol.

$$(C_4H_9CH(C_2H_5)C_2H_4CHC_2H_4CH(C_2H_5)_2)$$
$$|$$
$$SO_4Na$$

Essential oil mixture of any desired odor.
The above mentioned wetting agent $$(C_4H_9CH(C_2H_5)C_2H_4CHC_2H_4CH(C_2H_5)_2)$$
$$|$$
$$SO_4Na$$

is chemically known as the sodium sulfate derivative of 7-ethyl-2-methyl undecanol-4. The above agent, when applied in relatively small quantity to the back of a strip of adhesive tape, will immediately penetrate the fabric backing and the adhesive film and render the latter non-tacky or non-adherent, so that in a matter of a few seconds the adhesive tape may be freely lifted off without the slightest amount of pulling or tearing of the flesh and hair. It will be noted that the bond between the adhesive or tacky film and the fabric backing will not be materially loosened, and that if the fabric backing is pulled away the entire adhesive film will come away with it, leaving no residual deposit upon the surface of the skin. Apparently the agents of the present invention operate by rendering the adhesive material non-tacky and thereby loosening the bond between the skin and the adhesive preferentially, that is to say, without materially effecting the bond between the adhesive film and the fabric backing. In any case, regardless of theory of operation, agents of the present invention have been found to loosen adhesive tape and other similar gummy substances immediately and permit complete removal thereof without irritation of the flesh and without any of the other annoyances which have heretofore been encountered.

It should be understood that changes in the methods, compositions, percentages, and combinations above set forth may be made without departing from the nature and principle of my invention.

Having thus described my invention, what I claim and desire to secure by Letters Patent is:

1. An agent for loosening adhesive tape and similar gummy substances consisting essentially of:

Di-ethyl ether of ethylene glycol __ 2 parts by vol.
Mono-butyl ether of ethylene glycol _____ 1 part by vol.
Wetting agent _____ 0.20% by vol.

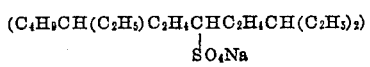

2. An agent for loosening adhesive tape and similar gummy substances consisting essentially of Di-ethyl ether of ethylene glycol __ 2 parts by vol.
Mono-butyl ether of ethylene glycol _____ 1 part by vol.

and a small amount of wetting agent consisting of the sodium sulfate derivative of 7-ethyl-2-methyl undecanol-4.

THEODORE E. WEICHSELBAUM.

REFERENCES CITED

The following references are of record in the file of this patent:

UNITED STATES PATENTS

| Number | Name | Date |
|---|---|---|
| 2,169,231 | Fife | Aug. 15, 1939 |
| 2,199,712 | Neilson | May 7, 1940 |
| 2,317,505 | Wassell | Apr. 27, 1943 |

FOREIGN PATENTS

| Number | Country | Date |
|---|---|---|
| 495,766 | Great Britain | Nov. 16, 1938 |

OTHER REFERENCES

Industrial Solvents, Mellan (1939), pages 314–315.

Synthetic Organic Chemicals, booklet of Carbide and Carbon Chemical Corporation, New York, 12 ed. (1945), pages 30, 31, 36, 37, 87 and 89.